United States Patent [19]

Fujita et al.

[11] 4,334,035

[45] Jun. 8, 1982

[54] UNSATURATED POLYESTER RESIN COMPOSITION

[75] Inventors: Taketoshi Fujita; Yasuyuki Ohgi; Yousui Nemoto, all of Yokkaichi, Japan

[73] Assignee: Mitsubishi Petrochemical Co., Ltd., Tokyo, Japan

[21] Appl. No.: 245,436

[22] Filed: Mar. 19, 1981

[51] Int. Cl.³ .............................................. C08G 63/54
[52] U.S. Cl. ....................................... 525/34; 525/36; 525/40; 528/304
[58] Field of Search ........................... 525/34, 36, 40; 528/304

[56] References Cited

U.S. PATENT DOCUMENTS

| | | | |
|---|---|---|---|
| 3,026,286 | 3/1962 | Parker | 525/40 |
| 3,933,875 | 1/1976 | Brose et al. | 525/40 |
| 4,290,938 | 9/1981 | Miyake et al. | 525/40 |

Primary Examiner—Maurice J. Welsh
Attorney, Agent, or Firm—Oblon, Fisher, Spivak, McClelland & Maier

[57] ABSTRACT

An unsaturated polyester resin composition comprising (A) an unsaturated polyester alkyd prepared by condensing all or at least 30 mol% of 1,2-butanediol as a polyhydric alcohol component, all or part of phthalic anhydride as a saturated polybasic acid component, and an unsaturated polybasic acid component, and (B) an unsaturated monomer copolymerizable with component (A), the amount of component (B) being 20 to 55 parts by weight based on 100 parts by weight of component (A) is disclosed. The thus-formed unsaturated polyester resin composition is of low viscosity and is easy in filling with glass fibers, pigments, inorganic fillers, etc. Further, it has such advantages that the smell of the unsaturated monomer is low and that the influence against human beings due to evaporation of the unsaturated monomer can be reduced.

3 Claims, No Drawings

UNSATURATED POLYESTER RESIN COMPOSITION

FIELD OF THE INVENTION

This invention relates to a low-viscosity unsaturated polyester resin composition that has little smell of the vinyl monomer component.

BACKGROUND OF THE INVENTION

An unsaturated polyester alkyd has hitherto been produced by condensing a mixture of an unsaturated polybasic acid such as maleic anhydride or fumaric acid and a saturated polybasic acid such as phthalic anhydride, with a polyhydric alcohol such as propylene glycol or ethylene glycol. Such an unsaturated polyester alkyd is cross-linked with an unsaturated monomer such as styrene to form a cured product which is useful as, for example, a construction material, casting and paint.

However, a commonly used unsaturated polyester resin, for example, one which is the most commonly used and which comprises 100 parts by weight of a polyester alkyd having a molecular weight of 1,200 to 2,200 which is prepared from maleic anhydride, phthalic anhydride and propylene glycol, and 60 to 150 parts by weight of a styrene monomer has a strong smell of the styrene monomer that causes a headache in molding operators. The evaporation of the vinyl monomer such as styrene can be reduced by blending a small amount of the vinyl monomer with the unsaturated alkyd. But, a composition comprising 100 parts by weight of the above-illustrated unsaturated alkyd and 60 parts by weight of a styrene monomer generally has a viscosity of about 500 cps at 25° C., and to use even less styrene monomer results in a composition of higher viscosity which is difficult to be blended with glass fibers or inorganic fillers.

In the course of efforts to eliminate these defects of the conventional unsaturated polyester resin, it was noted that if the viscosity of the unsaturated polyester alkyd is low, then the amount of the vinyl monomer to be used can be reduced, and that hence, not only the smell of the vinyl monomer can be inhibited, but also the following problems due to the high viscosity of the unsaturated polyester alkyd can be solved. Based on this recognition, it was attempted to produce various unsaturated polyester alkyds to thereby find the desired low-viscosity alkyd.

(1) If the unsaturated polyester alkyd produced has high viscosity, the agitation becomes insufficient to cause decrease of the reaction rate and formation of a gel due to local heating; and (2) The unsaturated polyester alkyd prepared is dissolved in an unsaturated monomer such as styrene at a temperature which is reduced to prevent gelation, but as the temperature becomes low, the viscosity is increased to reduce the solubility of the alkyd, and in consequence, lumps of the alkyd are formed which impairs the appearance of the cured product or decreases its impact strength. If the formation of alkyd lumps is avoided by increasing the amount of unsaturated monomer, only a brittle cured product results. The high viscosity of the alkyd is particularly disadvantageous in a winter season.

As a result of studies to solve these problems, it has been found that an unsaturated polyester alkyd of very low viscosity can be produced if 1,2-butanediol that is currently burnt away or discarded as a waste is used as the polyhydric alcohol component and phthalic anhydride as the polybasic acid.

SUMMARY OF THE INVENTION

Therefore, one object of this invention is to provide a low-viscosity unsaturated polyester resin composition that has little smell of the vinyl monomer component.

Another object of the invention is to provide a method of effectively utilizing 1,2-butanediol that is produced as a by-product in an amount of 30 to 45 wt% by oxidizing the double bonds of butadiene with oxygen or an organic peroxide and hydrogenolyzing the resulting peroxide and which is currently burnt away or discarded as a waste.

This invention provides an unsaturated polyester resin composition comprising (A) an unsaturated polyester alkyd prepared by condensing all or at least 30 mol% of 1,2-butanediol as the polyhydric alcohol component, all or part of phthalic anhydride as the saturated polybasic acid component, and an unsaturated polybasic acid component, and (B) an unsaturated monomer copolymerizable with component (A), the amount of component (B) being 20 to 55 parts by weight based on 100 parts by weight of component (A).

The alkyd as component (A) according to this invention has low viscosity, thus the condensation reaction for its production can be achieved without undergoing difficulty in agitation, decrease in the reaction rate and gelation due to local heating. The condensed alkyd has high solubility in the unsaturated monomer, thus it can be dissolved in the monomer at a temperature lower than so far required, with the resulting advantage that no gel is formed of the alkyd.

As a further advantage, if the unsaturated alkyd according to this invention having a molecular weight of 1,200 to 3,000 is used, less unsaturated monomer is required to prepare a resin composition having the same viscosity as that of the conventional product, thus a cured product having increased heat resistance and mechanical strength can be provided. Furthermore, an alkyd having a higher molecular weight as high as 2,200 to 4,000 can be produced if its viscosity is the same as that of the conventional product, thus a cured product having improved heat resistance, alkali resistance and mechanical strength can also be provided.

DETAILED DESCRIPTION OF THE INVENTION

Component (A) as the unsaturated polyester alkyd of the unsaturated polyester resin composition of this invention can be prepared by charging a reactor with a saturated polybasic acid component containing phthalic anhydride, a polyhydric alcohol component containing 1,2-butanediol, and an unsaturated polybasic acid component and co-condensing these three components. For the co-condensation reaction, if desired, an esterifying catalyst such as tetrabutyl zirconate, zirconium naphthenate or tetrabutyl titanate may be used. The reaction is generally performed at between 180° and 230° C. under atmospheric or elevated pressure.

The completion of the co-condensation is determined by measuring the acid value of the condensate. Generally, the reaction is terminated when the acid value of the condensate is less than 40, preferably less than 20. The molecular weight of the condensate varies with such factors as the type of the starting materials and the reaction conditions, and it is generally in the range of from about 1,500 to 3,000. The proper formulation of the starting materials for the condensate (i.e., the unsaturated polyester alkyd) is selected depending upon the use and the objective of use of the resin composition and the conditions for the production of the condensate. The molar ratio of the unsaturated polybasic acid to the saturated polybasic acid in the condensate is generally selected at 8:1 to 1:8, preferably at 4:1 to 1:4. If the ratio is not within the stated range, it often happens that a resin prepared by curing a liquid unsaturated polyester resin composition prepared by blending the condensate and an unsaturated monomer no longer has the inherent properties of the unsaturated polyester resin composition. But, it should be understood that a value outside the above range may be selected if the use and the objective of use of the resin composition so permit. A liquid resin composition prepared by blending an unsaturated monomer with a condensate that meets the above-stated requirements for molar ratio but which contains more saturated polybasic acid than unsaturated polybasic acid is suitable for use as a resin for castings and as a paint. On the other hand, a condensate which contains more unsaturated polybasic acid than saturated polybasic acid is suitable for use as electrical insulators and castings that are required to have high compression strength and heat deformation temperature.

The molar ratio of the sum of the saturated polybasic acid and the unsaturated polybasic acid to the polyhydric alcohol component of the condensate is generally about 1, for example, about 0.95 to 1.15 mols of the former is contained per mol of the polyhydric alcohol component. If excess acid or polyhydric alcohol is used, a cured product having low mechanical strength, electrical properties and chemical resistant is obtained.

Suitable examples of the polyhydric alcohol component of the alkyd which can be used together with 1,2-butanediol include ethylene glycol, diethylene glycol, propylene glycol, glycerin, trimethylolpropane, pentaerythritol, 1,4-butanediol, neopentyl glycol, 2,2,4-trimethylol-1,3-pentanediol, 2-ethyl-1,3-hexanediol, hydrogenated bisphenol A, 1,3-butanediol, tricyclo[5,2,1,0$^{2,6}$]-decane-3,8-dimethylol, and tricyclo[5,2,1,0$^{2,6}$]decane-4,9-dimethylol. The amount of 1,2-butanediol in the polyhydric alcohol component is more than 30 mol%, preferably more than 50 mol%, particularly preferably more than 70 mol%. If the resin composition is used to make a glass fiber reinforced cured product, 1,2-butanediol is preferably combined with propylene glycol to achieve intimate contact with glass fibers, and in this case, 30 to 50 mol% of 1,2-butanediol is contained in the polyhydric alcohol component. If the resin composition is used to make a paint, 1,2-butanediol is preferably combined with 2,2,4-trimethylol-1,3-pentanediol, and in this case, 30 to 90 mol% of 1,2-butanediol is contained in the polyhydric alcohol component. If the polyhydric alcohol component is composed of only propylene glycol, an alkyd having reduced viscosity is not obtained, and hence, the amount of the vinyl monomer that is necessary for producing the desired unsaturated polyester resin composition cannot be reduced.

Suitable examples of the saturated polybasic acid component which can be used together with phthalic anhydride include tetrachlorophthalic anhydride, succinic acid, adipic acid, azelaic acid, sebacic acid, myrcenemaleic anhydride adduct, alloocimene-maleic anhydride accuct, tetrahydrophthalic anhydride, hexachloroendmethylenetetrahydrophthalic anhydride, and rosin-maleic anhydride adduct. The amount of these saturated polybasic acids other than phthalic anhydride in the saturated polybasic acid component is preferably less than 20 mol% so as to produce an alkyd of low viscosity.

An unsaturated polyester alkyd prepared by reacting terephthalic acid or isophthalic acid as the saturated polybasic acid component, 1,2-butanediol as the polyhydric alcohol component, and an unsaturated polybasic acid has a lower viscosity than alkyds using other polyhydric alcohols because of the use of 1,2-butanediol (see the specification of Japanese Patent Application (OPI) No. 45702/80), but its viscosity is much higher than that of an alkyd prepared from phthalic anhydride as the saturated polybasic acid component. For instance, to prepare a resin composition from the alkyd and styrene having a viscosity of 4.5 poises at 25° C., 28% of styrene is required for an alkyd prepared by using a saturated polybasic acid component that mainly consists of phthalic anhydride (i.e., about 40 parts by weight of styrene per 100 parts by weight of the alkyd), whereas 38 to 40 wt% of styrene is required for an alkyd prepared by using a saturated polybasic acid component that mainly consists of terephthalic acid or isophthalic acid (i.e., about 61 to 67 parts by weight of styrene per 100 parts by weight of the alkyd). The great proportion of styrene results in increased evaporation of styrene from the resin composition.

The third component of the unsaturated polyester alkyd is an unsaturated polybasic acid. Examples of such unsaturated polybasic acid include fumaric acid, maleic anhydride, citraconic acid and itaconic acid with maleic anhydride and fumaric acid being preferred. Maleic anhydride is preferably combined with 1,2-butanediol and another polyhydric alcohol such as propylene glycol or diethylene glycol.

The so prepared unsaturated polyester alkyd resin is subsequently dissolved in an unsaturated monomer to produce an unsaturated polyester resin composition. Any unsaturated monomer that is copolymerizable with the unsaturated polyester alkyd may be used. Suitable examples of unsaturated monomers which can be used include styrene, α-methylstyrene, p-chlorostyrene, vinyl acetate, bisallyl carbonate, diallyl ether, p-t-butylstyrene, vinyltoluene, divinylbenzene, 4-vinyl cyclohexene, methyl acrylate, glycidyl acrylate, glycidyl methacrylate, triallyl cianurate, hydroxyethyl acrylate, hydroxyethyl methacrylate, and hydroxypropyl methacrylate. These unsaturated monomers may be used either alone or in combination. Styrene is preferred for its low cost and high miscibility with the alkyd.

The desired method of reacting the unsaturated polyester alkyd with the unsaturated monomer according to this invention is as follows: when the desired degree of esterification is obtained in the reaction for the preparation of the unsaturated polyester alkyd, the temperature of the reaction system is held at about 80° to 150° C., and the unsaturated monomer is added to the reaction system, optionally in the presence of a polymerization inhibitor such as hydroquinone, in such a manner that a uniform reaction mixture is formed. From 20 to 55 parts by weight, preferably 30 to 50 parts by weight, of the unsaturated monomer is used per 100 parts by weight of the unsaturated polyester alkyd. If the amount of the unsaturated monomer is less than 20 parts by weight, the resin solution comprising the mixture of the unsaturated polyester alkyd and the unsaturated monomer has so high a viscosity that it cannot be given a desired shape easily. Furthermore, the cured resin product has low chemical resistance. If the amount of the unsaturated monomer is more than 55 parts by weight, increased evaporation of styrene and other vinyl monomers causes a hygienic problem to the worker.

The unsaturated polyester resin composition of this invention is generally cured by generating radicals either at elevated or room temperature in the presence of 0.005 to 5 parts by weight, preferably 0.05 to 2 parts by weight, based on the weight of the unsaturated polyester resin (the sum of the unsaturated polyester alkyd and the unsaturated monomer), of one or more polymerization initiators such as an organic peroxide (e.g., benzoyl peroxide, methyl ethyl ketone peroxide, cumene hydroperoxide, cyclohexanoyl peroxide, lauroyl peroxide or t-butyl peroxide) or a diazo compound (e.g., azobisisobutyronitrile), and optionally 0.005 to 5 parts by weight of one or more polymerization accelerators such as cobalt naphthenate, cobalt octenoate, aliphatic amines and mercaptan. The uncured unsaturated polyester resin composition of this invention may be further blended with a pigment such as titanium white or carbon black, a filler such as clay, talc or calcium carbonate, a reinforcing fibrous material such as glass fibers, polyester fibers, asbestos or quartz fibers, a thickener such as magnesium oxide, magnesium hydroxide, calcium oxide or calcium hydroxide or a demolding agent such as zinc stearate, calcium stearate, or aluminum stearate, and may be used in various forms such as paint, FRP, SMC, BMC and premix.

Instead of 1,2-butanediol which is used as the polyhydric alcohol in the unsaturated polyester alkyd according to this invention, 1,4-butanediol which is an isomer of 1,2-butanediol and which has been conventionally used in the production of a phthalic anhydride-based unsaturated polyester resin may be used, but in fact, the alkyd prepared by using such isomer has high viscosity, and hence, it does not achieve the purposes of this invention. Alternatively, another isomer, 1,3-butanediol, may be used, but this again is not effective because a longer time is required for producing an alkyd having the same molecular weight as that of the alkyd according to this invention and yet only a cured product having low mechanical strength is produced.

This invention is now described in greater detail by reference to the following Examples and Comparative Examples which are given here for illustrative purposes only and are by no means intended to limit the scope of the invention. In these Examples and Comparative Examples, all parts and percents are by weight, unless otherwise specified.

EXAMPLE 1

A 5-liter stainless steel reactor equipped with a condenser, a rotary stirrer and a thermometer was charged with 702 g (7.16 mols) of maleic anhydride, 1,060 g (7.16 mols) of phthalic anhydride and 1,482 g (16.5 mols) of 1,2-butanediol, and the mixture was esterified at 205° to 210° C. under atmospheric pressure for 6 hours while blowing into the reactor 2 liters of nitrogen gas per minute under stirring. An unsaturated polyester alkyd having an acid value of 11 was thus produced. The alkyd was cooled to 130° C., and a styrene monomer was added thereto such that the styrene monomer content was 28%. Thereafter, the mixture was well stirred to provide a liquid unsaturated polyester resin composition. The composition was found to be colorless and transparent and have a viscosity of 4.5 poises at 25° C.

The composition was placed in an airtight room of 27 $m^3$ at a temperature of 25° C., and a 2-layer laminate of chopped glass strand mat measuring 50×50 cm and weighing 450 g per square meter was impregnated with the composition by hand lay-up such that the glass content was about 30%. The amount (in grams) of the styrene monomer that evaporated from the laminate per square meter was measured, and the results obtained are shown in Table 1 below.

A 2-layer laminate of chopped glass strand mat of the same size and weight as those specified above was impregnated with an initmate mixture of 100 parts of the resin composition, 0.5 part of 6% cobalt naphthenate, and 1 part of 0.5% methyl ethyl ketone peroxide such that the glass content was about 30%. The laminate was then allowed to stand at room temperature for gelation, and the gelled product was heated at 120° C. for 2 hours to provide a cured sheet having a thickness of 3.2 mm. The sheet was subjected to a bending test in compliance with JIS K-7203 (corresponding to ASTM D 790-71 or DIN 43452), and the results obtained are also shown in Table 1 below.

EXAMPLE 2

An unsaturated polyester alkyd having a molecular weight of 2,200 and an acid value of 11 was produced by repeating the same procedure of Example 1 except that a half of the number of mols of 1,2-butanediol was replaced by propylene gylcol. The alkyd was subsequently treated in the same manner as in Example 1 to produce a resin composition. The resin composition thus-produced was evaluated in the same manner as in Example 1, and the results obtained are shown in Table 1 below.

EXAMPLE 3

An unsaturated polyester alkyd having a molecular weight of 2,400 and an acid value of 11 was produced by repeating the same procedure of Example 1 except that 30% of the number of mols of 1,2-butanediol was replaced by 2,2,4-trimethylol-1,3-pentanediol. The alkyd was subsequently treated in the same manner as in Example 1 to produce a resin composition. The resin composition thus-produced was evaluated in the same manner as in Example 1, and the results obtained are shown in Table 1 below.

COMPARATIVE EXAMPLE 1

An unsaturated polyester alkyd having a molecular weight of 2,250 was produced by repeating the same procedure of Example 1 except that 16.5 mols of 1,2-butanediol was replaced by an equal molar amount of propylene glycol. The alkyd was subsequently treated in the same manner as in Example 1 to produce a resin composition.

The resin composition thus-produced was evaluated in the same manner as in Example 1, and the results obtained are shown in Table 1 below.

COMPARATIVE EXAMPLE 2

An unsaturated polyester alkyd was produced by repeating the same procedure of Comparative Example 1 except that the conditions of esterification were such that the alkyd had an acid value of 55 and a molecular weight of 650. The alkyd was subsequently treated in the same manner as in Example 1 to produce a resin composition.

The resin composition thus-produced was evaluated in the same manner as in Example 1, and the results obtained are shown in Table 1 below.

COMPARATIVE EXAMPLE 3

A 5-liter stainless steel reactor equipped with a condenser, a rotary stirrer and a thermometer was charged with 1,188 g (7.16 mols) of isophthalic acid and 1,482 g (16.5 mols) of 1,2-butanediol, and the mixture was esterified at 210° to 230° C. and at 3.5 kg/cm²G for 6 hours while blowing into the reactor 2 liters of nitrogen gas per minute under stirring. After confirmation of the absence of the unreacted isophthalic acid precipitate, the contents of the reactor were cooled to 150° C., and 830 g (7.16 mols) of maleic anhydride was added, followed by condensation at 210° C. under atmospheric pressure for 6 hours. An alkyd having an acid value of 12 was thus formed.

The resulting condensate was cooled to 130° C., and mixed thoroughly with a styrene monomer under stirring such that the styrene monomer content was 38% to prepare a liquid unsaturated polyester resin composition. The thus-prepared resin composition was found to be colorless and transparent and have a viscosity of 4.5 poises at 25° C.

The resin composition was evaluated in the same manner as in Example 1, and the results obtained are shown in Table 1 below.

COMPARATIVE EXAMPLE 4

An unsaturated polyester alkyd having an acid value of 10 was prepared by repeating the same procedure of Comparative Example 3 except that all of the isophthalic acid was replaced by terephthalic acid. The alkyd was cooled to 130° C., and mixed thoroughly with a styrene monomer under stirring such that the styrene monomer content was 40% to prepare a liquid unsaturated polyester resin composition. The thus-prepared resin composition had a viscosity of 4.5 poises at 25° C.

The resin composition was evaluated in the same manner as in Example 1, and the results obtained are shown in Table 1 below.

TABLE 1

| Example No. | Resin Composition ||||||||| Bending test with the Cured Product ||
|---|---|---|---|---|---|---|---|---|---|---|
| | Alkyd Content (%) | Styrene Content (%) | Viscosity (at 25° C.) (poises) | Styrene Evaporation* (g/m²) ||||| Strength (kg/mm²) | Elastic Modulus (kg/mm²) |
| | | | | Min. Later | 20 Min. Later | 40 Min. Later | 60 Min. Later | 80 Min. Later | | |
| Example No. | | | | | | | | | | |
| 1 | 72 | 28 | 4.5 | 20/15 | 40/20 | 55/20 | 65/20 | 70/20 | 19.8 | 695 |
| 2 | 72 | 28 | 6.2 | 23/16 | 42/23 | 58/23 | 68/23 | 73/23 | 19.5 | 690 |
| 3 | 75 | 25 | 4.5 | 18/13 | 38/18 | 50/18 | 60/18 | 65/18 | 20.2 | 705 |
| Comparative Example No. | | | | | | | | | | |
| 1 | 72 | 28 | 12.8 | 30/20 | 60/30 | 80/30 | 100/30 | 120/30 | 13.5 | 450 |
| 2 | 72 | 28 | 4.5 | 23/16 | 43/23 | 58/23 | 68/23 | 73/23 | 10.5 | 320 |
| 3 | 62 | 38 | 4.5 | 30/20 | 60/30 | 82/35 | 100/35 | 125/40 | 19.9 | 720 |
| 4 | 60 | 40 | 4.5 | 33/22 | 65/35 | 85/40 | 105/45 | 130/50 | 21.5 | 735 |

*Left figures: paraffin not added
Right figures: 0.1% paraffin added to the resin composition While the invention has been described in detail and with reference to specific embodiments thereof, it will be apparent to one skilled in the art that various changes and modifications can be made without departing from the spirit and scope thereof.

What is claimed is:

1. An unsaturated polyester resin composition comprising (A) an unsaturated polyester alkyd prepared by condensing all or at least 30 mol% of 1,2-butanediol as a polyhydric alcohol component, all or part of phthalic anhydride as a saturated polybasic acid component, and an unsaturated polybasic acid component, and (B) an unsaturated monomer copolymerizable with said component (A), the amount of said component (B) being 20 to 55 parts by weight based on 100 parts by weight of said component (A).

2. The composition of claim 1, wherein said polyhydric alcohol component is a mixture of 30 to 50 mol% of 1,2-butanediol and 70 to 50 mol% of propylene glycol.

3. The composition of claim 1, wherein said polyhydric alcohol component is a mixture of 30 to 90 mol% of 1,2-butanediol and 70 to 10 mol% of 2,2,4-trimethylol-1,3-pentanediol.

* * * * *